Jan. 18, 1966    C. JONES    3,229,774
CULTIVATOR FOR DESTROYING WEEDS
Filed Sept. 13, 1963    4 Sheets-Sheet 3
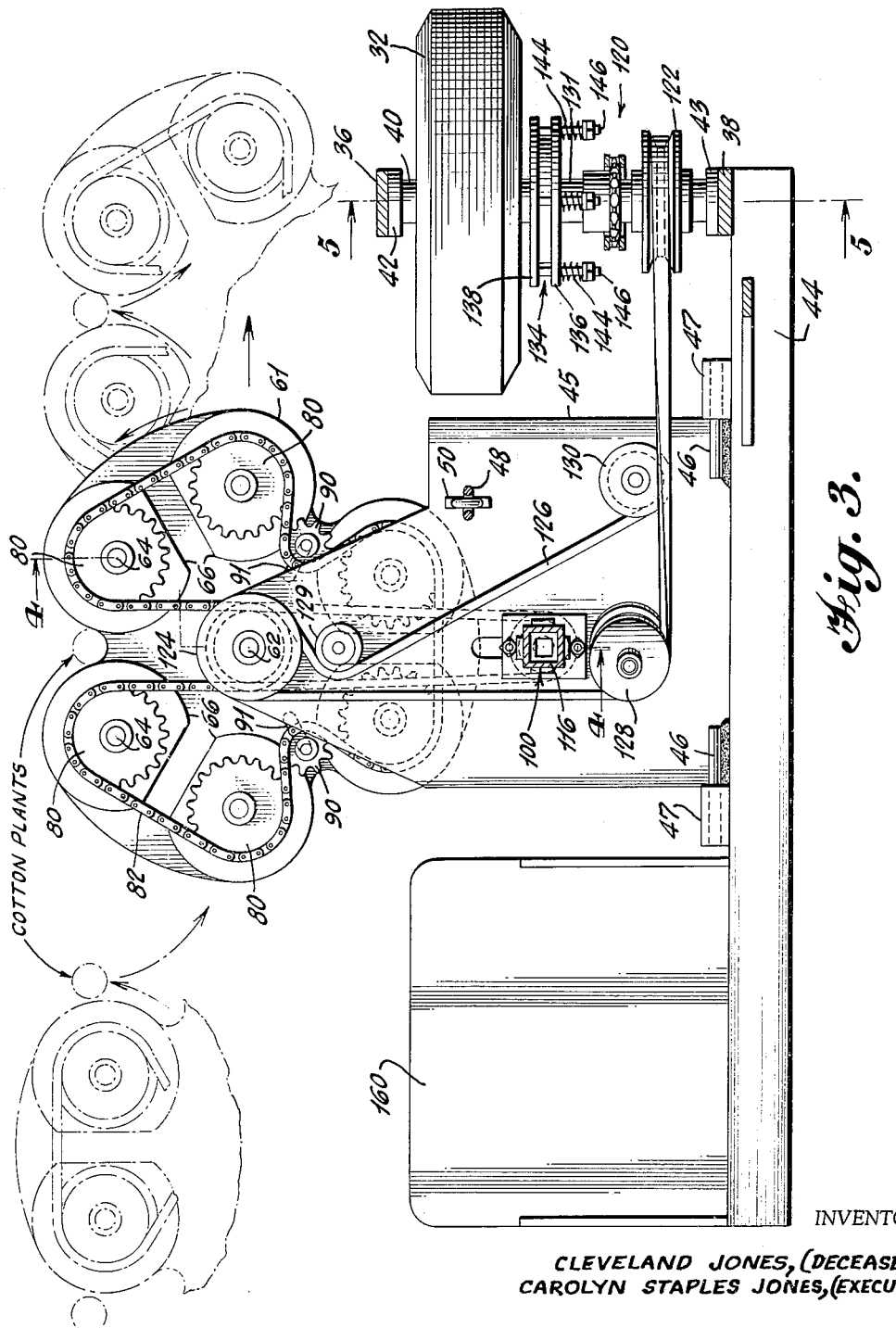
INVENTOR
CLEVELAND JONES, (DECEASED)
CAROLYN STAPLES JONES, (EXECUTRIX)
BY
Burns, Doane, Benedict, Swecker & Mathis
ATTORNEYS

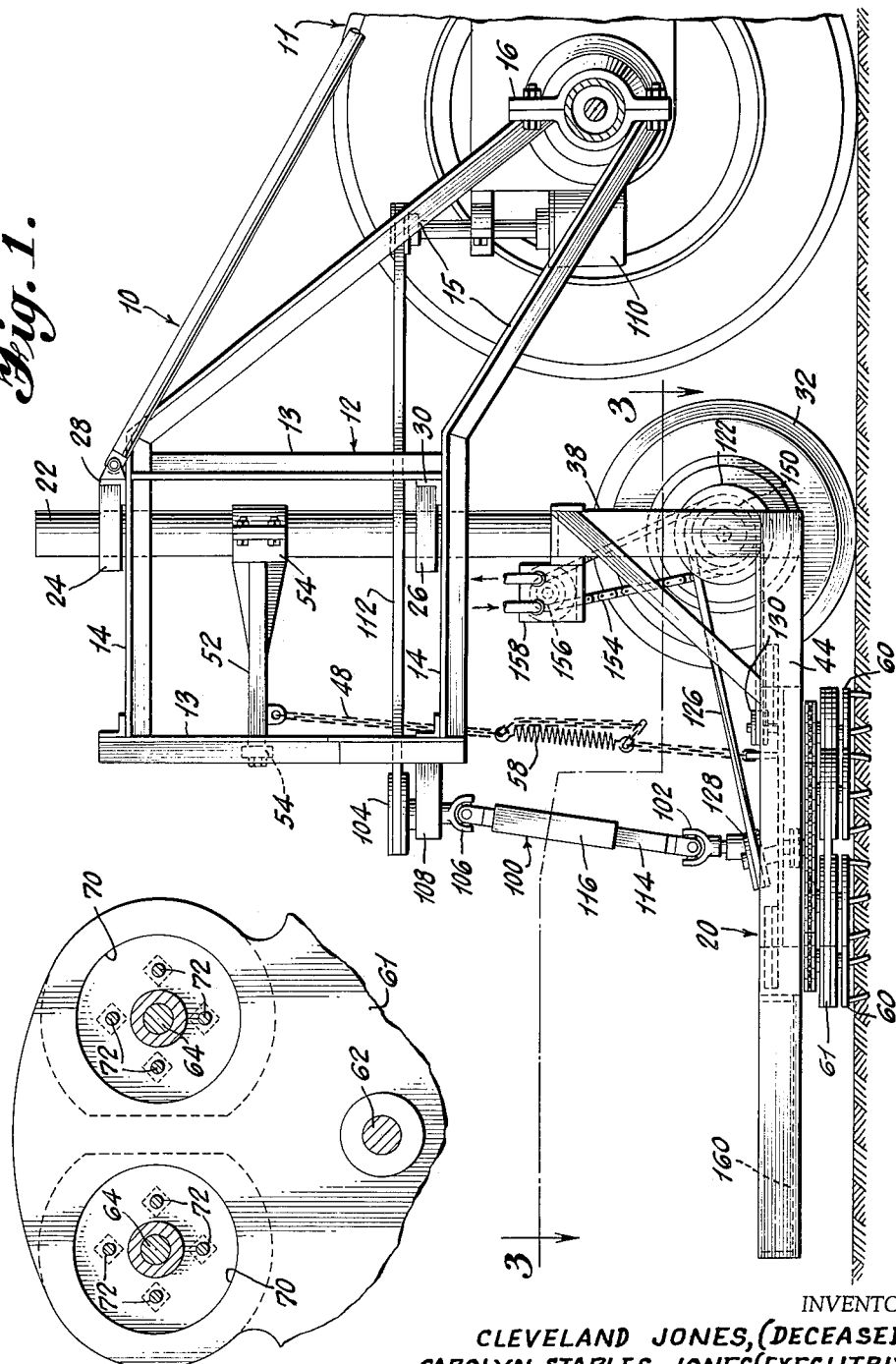

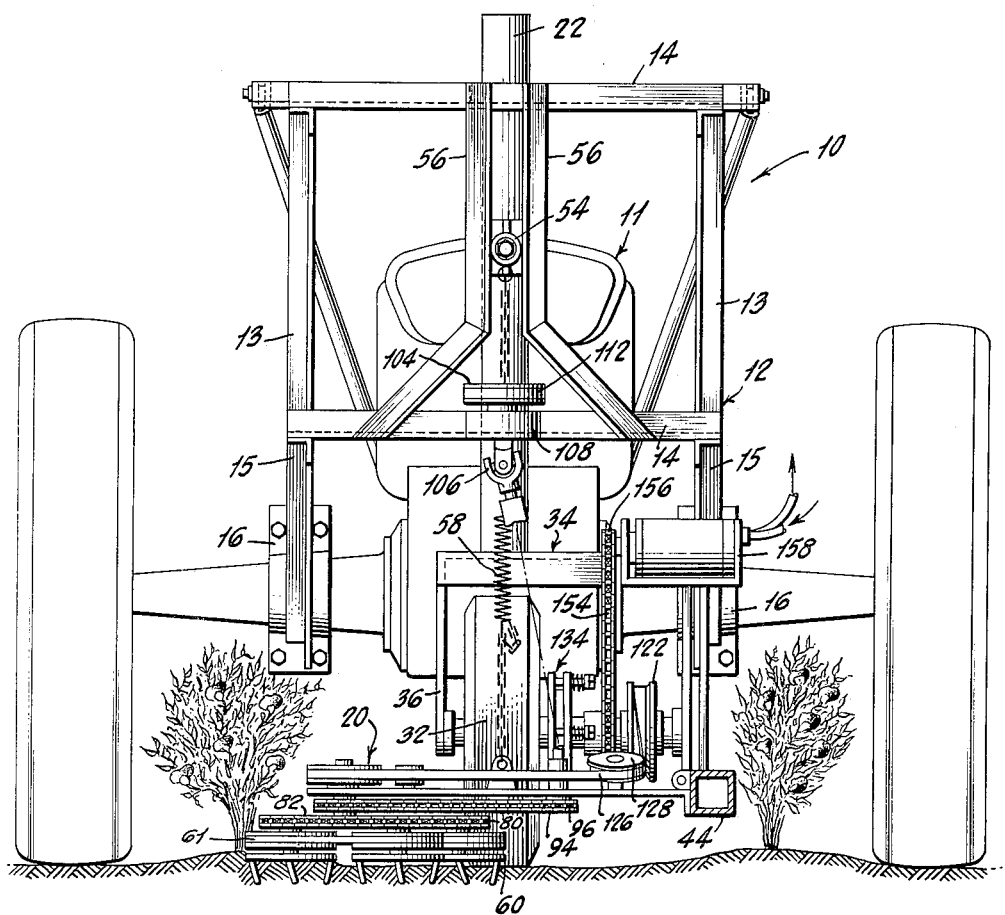

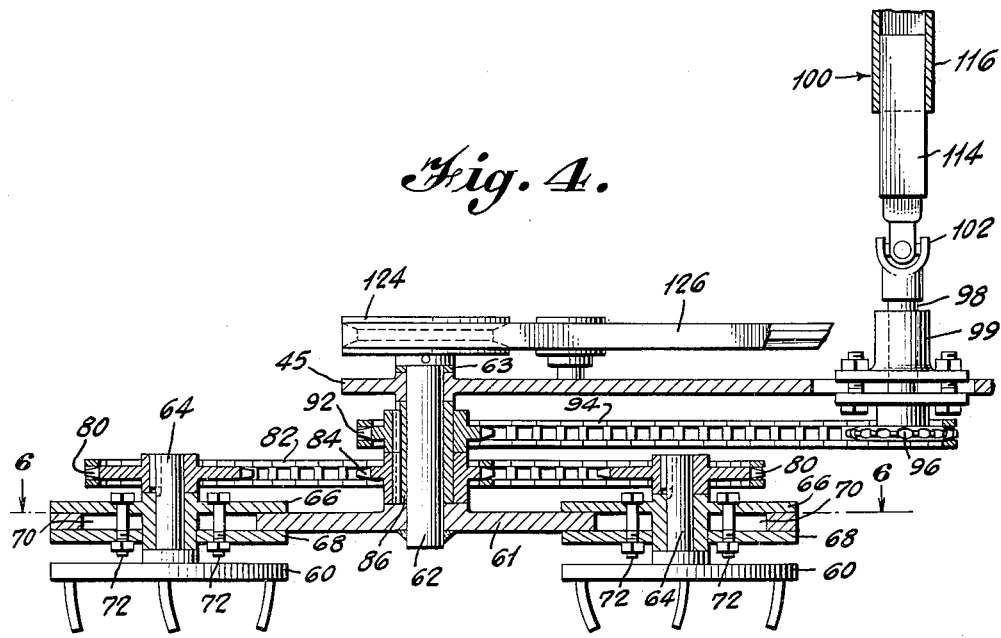
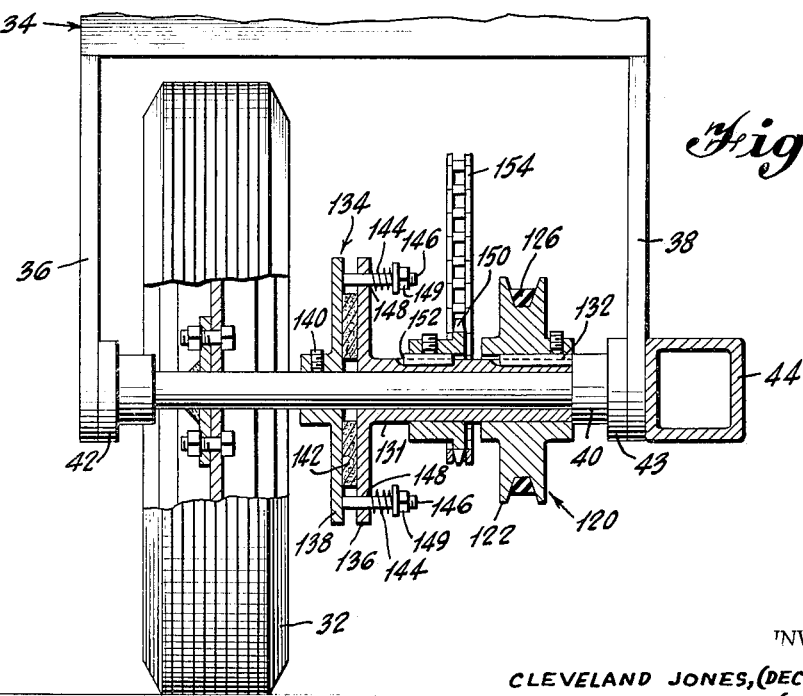

3,229,774
CULTIVATOR FOR DESTROYING WEEDS
Cleveland Jones, deceased, late of Inverness, Miss., by Carolyn Staples Jones, executrix, Inverness, Miss.
Filed Sept. 13, 1963, Ser. No. 309,377
6 Claims. (Cl. 172—92)

This invention relates generally to a cultivator and more specifically to a cultivator for destroying weeds.

Weeds are a substantial problem to the farmer. This is particularly true in raising crops such as cotton, which plants can easily be smothered by weeds growing in abundance in the field. Crops such as cotton are usually planted in fields at predetermined intervals in spaced rows across the field. Due to the size of the cotton plant and the rapid rate of growth of weeds, unless the weeds are removed during the growing period of the cotton plant, there is a great possibility that the weeds will crowd out the cotton plant and ruin the crop. Further, it is very undesirable to have weeds present at the time the crop is harvested.

Heretofore, weeds growing between cotton plants were pulled manually. This is a very time consuming and expensive method to clear the field of weeds.

Weeds that grow between the rows of plants, such as cotton or the like, present no particular problem in that an appropriate implement may be pulled by a tractor to cultivate the soil between rows of cotton and to uproot any weeds growing therein. The areas between the cotton plants in a row presents an entirely different problem, however, since the same mechanism could not be utilized to remove weeds in such areas.

There have been endeavors to provide mechanisms which may be pulled by a tractor and moved in and out of the spaces between the cotton plants to destroy the weeds growing therein. Such mechanisms, however, have been subject to many disadvantages.

It is, therefore, an object of this invention to provide apparatus for destroying weeds between plants, such as cotton or the like, which may be pulled by a tractor and is moved between plants without damage to the plants.

It is a further object of this invention to provide means for destroying weeds between plants such as cotton or the like, which may be pulled by a tractor and is moved between plants in response to the distance moved by the tractor.

It is still a further object of this invention to provide means for removing weeds from between plants, such as cotton of the like, which is actuated in response to the distance traveled by the tractor including means to adjust the movement of the means relative to the plants.

These and other objects of the invention may be accomplished according to one embodiment of the invention wherein a frame is provided which is adapted to be secured to a tractor. The frame includes a wheel mounted thereon which is adapted to engage and to rest on the ground. Weed cutting means are provided and are adapted to be driven by the power takeoff of the tractor. The weed cutting means are mounted on a member which is formed so as to position the cutter means between plants without damaging the plants. A plurality of such cutting means are provided and are adapted to be moved alternately into the spaces between the cotton plants. The means for positioning the cutter means is operatively connected to the ground engaging wheel so that the cutting means are moved in response to the movement of the apparatus across the ground.

Further, in the event that such movement is not properly oriented with respect to the space between the plants, means are provided to correct this movement.

This embodiment is illustrated in the accompanying drawings in which:

FIG. 1 is a side elevational view of the invention attached to a tractor, partially shown;

FIG. 2 is a real elevational view of the invention attached to a tractor;

FIG. 3 is a sectional view taken on line 3—3 of FIG. 1, showing various positions of the cutter means in broken lines;

FIG. 4 is a sectional view taken on line 4—4 of FIG. 3;

FIG. 5 is a sectional view taken on line 5—5 of FIG. 3; and

FIG. 6 is a sectional view taken on line 6—6 of FIG. 4.

The cultivator 10 comprises a supporting frame 12 adapted to be secured removably to the rear axle of a tractor on each side thereof adjacent each wheel. The supporting frame 12 includes a plurality of vertical bars 13 and horizontal bars 14, secured together rigidly as by welding into a box like portion. The box like portion of the frame is connected at each side thereof to a pair of cantilever members 15 secured rigidly to a clamp 16 which is adapted to be secured to the tractor axle by bolts or other suitable means. A weeding mechanism 20 is supported on the frame 12 for movement therewith and is adapted for movement relative thereto.

The supporting means for the weeding mechanism 20 includes an upright 22 mounted in bushings 24 and 26 supported in plates 28 and 30, respectively, which are secured rigidly to horizontal bars 14 of the frame 12. The lower end of the upright 22 is supported on a wheel 32 which is adapted to ride over the ground as the cultivator 10 is pulled by the tractor 11.

The wheel 32 is connected to the upright 22 by means of an inverted U-shaped bracket 34 having depending legs 36 and 38. The wheel 32 is supported on an axle 40 journaled in suitable bearings 42 and 43.

A beam 44 is connected rigidly to the leg 38. The beam 44 extends rearwardly of the wheel 32. The weeding mechanism 20 includes a base member 45 which is pivotally secured to the beam 44. The base member 45 is provided with a pair of pins 46 which are journaled in hubs 47 secured to the beam 44.

A chain 48, or other flexible means, normally maintains the base member 45 in a substantially horizontal position relative to the ground. The chain 48 is secured at its one end to an ear 50 which is rigidly connected to the base member 45. The other end of the chain 48 is connected to an arm 52, see FIG. 1.

The arm 52 is connected to the upright 22 by a clamp 54. The arm 52 is provided, at its free end, with a roller 54, or other suitable anti-friction means. The roller 54 is adapted to engage and to move between upright tracks 56 secured to the frame 12.

In this manner the weeding mechanism 20 and its supporting means may move vertically with respect to the stationary frame 12 attached to the tractor 11. The arm 52 and the supporting mechanism maintains the weeding mechanism 20 a predetermined distance above the ground.

A spring 58 may be connected between links of the chain 48 to provide resilient means to absorb shock and permit pivotal movement of the base member 45 relative to the beam 44.

The weeding mechanism 20 includes a plurality of cutter heads 60, of conventional construction, which are adapted to be moved between plants along the rows in a field.

The cutter heads 60 are mounted on a rigid plate 61, shaped somewhat in the form of a clover leaf, as best shown in FIG. 3, which is suspended from the base member 45 on a shaft 62. The shaft 62 is rotatably supported in a bearing 63 mounted on the base member 45. The cutter heads 60 are all mounted on the plate 61 in the same manner and it will therefore suffice to discuss the mounting means of one.

A cutter head 60 is secured to a shaft 64 which is journaled in a pair of clamping disks 66 and 68, as best shown in FIG. 4. The clamping disks 66 and 68 are adapted to engage the plate 61 on each side thereof. The shaft 64 extends through an aperture 70, FIG. 6, in the leaf portion of the plate 61. The clamping disks 66 and 68 are secured to the plate 61 by a plurality of bolts 72 which extend through the aperture 70. The aperture 70 is of sufficient size so that each pair of disks 66 and 68, with the cutter head 60 mounted thereon, may be moved relative to the plate 61 to vary the position of the cutter heads relative to each other and to the plate 61.

A pair of cutter heads 60 are mounted on each leaf portion of the plate 61 in the manner described above, as best shown in FIGS. 3 and 6. In this manner, a pair of cutter heads 60 will cooperate to penetrate the soil and uproot weeds.

Drive means are provided for rotating the cutter heads 60. A sprocket 80 is secured to the upper end of each shaft 64 above the associated clamping disks 66. A chain 82 operatively engages each of the sprockets 80 and a further sprocket 84 which is secured to a sleeve 86. The sleeve 86 surrounds the shaft 62 and is mounted for rotation relative thereto.

A pair of sprockets 90, see FIG. 3, are adjustably mounted on the plate 61 in slots 91 to vary the tension of the chain 82. A sprocket 92 is secured to the sleeve 86 above the sprocket 84. A chain 94 engages the sprocket 92 and a further sprocket 96 which is mounted on an axle 98 journaled in a bearing member 99 secured to the plate 45.

The sprocket 96 is driven by means connected to the power takeoff of the tractor. The upper end of the axle 98, on which the sprocket 96 is secured, is connected to a drive shaft 100 by a universal joint 102. The other end of the drive shaft 100 is connected to a pulley 104 by a further universal joint 106. The pulley 104 is mounted rotatably on a bracket 108 which is secured to the frame 12. The pulley 104 is connected to the power takeoff 110 of the tractor by a V-belt 112.

In this manner, the belt 112 drives the pulley 104 which in turn rotates the drive shaft 100, thus driving the sprocket 96. The sprocket 96 drives the chain 94 which engages the sprocket 92 mounted on the sleeve 86. Rotation of the sleeve 86 rotates the sprocket 84 which drives the chain 82 engaged with the sprockets 80 on the axles 64 of the cutter heads 60, thus rotating the cutter heads when the power takeoff is actuated.

The chain 82 engages the sprockets 80 in a manner to rotate adjacent sprockets in opposite directions as indicated by arrows in FIG. 3. In this manner a pair of cutter heads 60 cooperate to cultivate the soil to destroy the weeds.

The drive shaft 100 is adapted to permit vertical movement of the weeding mechanism 20. In the illustrated embodiment, the drive shaft 100 is comprised of a first rigid member 114 telescopically received in a hollow member 116. In this manner, as the weeding mechanism 20 and its supporting means move up and down relative to the frame 12, the movement is accommodated for by the one member 114 telescoping into and out of the other member 116.

Means are also provided to move each leaf portion into position between adjacent plants without damage to the plants. This is accomplished by rotating the clover leaf plate 61 so that as the cultivator 10 is pulled behind the tractor 11, a first leaf portion would extend into the area between plants, with the detent portion between leaf portions circumventing a plant as the plate is rotated, as best shown in FIG. 3. In this manner, as the apparatus is pulled along the field, each leaf portion in succession, would be rotated into the space between plants as the detent portion between these portions would permit the plant to extend therein without damage to the plant.

Rotation of the plate 61 is accomplished by means in direct contact with the ground so that such rotation will be directly correlated to the distance traveled by the cultivator 10.

Drive means 120 is connected to the axle of the wheel for actuation by rotation of the wheel. The drive means 120 includes a pulley 122 which drives a pulley 124, secured to the shaft 61, by means of a belt 126 extending between the pulleys. The belt is directed from the pulley 122 around an idler pulley 128 to the pulley 124 then around other pulleys 129 and 130 to the drive pulley 122.

The pulley 122 is mounted on a cylinder 131 by suitable means such as a key 132. The cylinder 131 is supported on the axle 40 for rotation relative thereto. The cylinder is connected to a slip clutch 134 so that the cylinder will be rotated upon rotation of the wheel 32 and the axle 40. The slip clutch 134 includes a first plate 136 rigidly secured to the cylinder 131. A second plate 138 is connected to the axle 40 by suitable means such as a set screw 140. Suitable lining 142 is secured to the face of the plate 138. The plate 136 is held in frictional contact with the lining 142 by springs 144 supported on bolts 146. The bolts 146 are connected to the plate 138 and extend through arcuate slots 148 in the plate 136. Nuts 149 maintain the springs 144 resiliently against the plate 136. In this manner the cylinder normally will be rotated by rotation of the wheel 32 and axle 40.

Means are provided, however, to change the position of the cylinder 131 and pulley 122 relative to the axle 40. This means is provided to correct the movement of the leaf portions of the plate 61 relative to the plants. For example, if after starting to move the cultivator 10 down a row of plants, the operator notices that the leaf portions with the cutter means 60 thereon are not moving into the spaces between plants properly and that the plants may be damaged, the cylinder 131 may be rotated relative to the axle 40 to advance or retard the rotation of the plate 61.

This means includes a sprocket 150 which is mounted on the cylinder 131 by suitable means such as a key 152. A chain 154 engages the sprocket 150 and a further sprocket 156 operatively connected to a reversible hydraulic motor 158. Upon actuation of the motor 158, the chain will rotate the sprocket 150 and cylinder 131 relative to the axle 40. The slip clutch 134 permits this rotation. The arcuate slots 148 permit the bolts 146 to rotate relative to the plate 136.

It will thus be understood that the rotation of the plate 61 relative to the wheel 32 may be varied by actuation of the hydraulic motor 158. The hydraulic motor is operated by the hydraulic system of the tractor. If desired an electric motor could be utilized.

A horizontal platform 160 may be provided for an operator to stand on during the weeding operation. The platform is rigidly secured to the beam 44.

While the invention has been described and illustrated in a certain embodiment, it is understood that changes may be made therein without departing from the invention as defined in the claims.

I claim:

1. Cultivating apparatus for cultivating the soil adjacent a row of spaced plants comprising a frame adapted to be secured to a tractor for movement therewith, a support mechanism movably mounted on said frame, a ground engaging wheel rotatably mounted on said support mechanism, a base member pivotally connected to said support mechanism, a rotatable plate mounted on said base member, means for rotating said plate, said plate rotating means being responsive to the rotation of, and operatively connected to, said ground engaging wheel, a plurality of horizontally spaced cutter means rotatably mounted on said plate, means for rotating said cutter means, and said plate being adapted upon rotation thereof to move said cutter means into the interstices between plants of the row for cultivating the soil therebetween as the apparatus is moved by the tractor along the field.

2. Cultivating apparatus for cultivating the soil adjacent a row of spaced plants comprising a frame adapted to be secured to a tractor for movement therewith, a support mechanism movably mounted on said frame, a ground engaging wheel rotatably mounted on said support mechanism, a base member pivotally connected to said support mechanism, a rotatable plate mounted on said base member, means for rotating said plate in response to the rotation of, and operatively connected to, said ground engaging wheel, a plurality of horizontally spaced cutter heads rotatably mounted on said plate, means for adjusting the rotation of said plate relative to the rotation of said ground engaging wheel, and said plate being adapted upon rotation thereof to move said cutter heads into the interstices between plants of the row for cultivating the soil therebetween.

3. Cultivating apparatus for cultivating the soil adjacent a row of spaced plants comprising a frame adapted to be secured to a tractor for movement therewith, a support mechanism slidably mounted on said frame, a ground engaging wheel rotatably mounted on said support mechanism, a base member pivotally connected to said support mechanism, a substantially clover-leaf shaped plate rotatably mounted on said base member, means for rotating said plate, a plurality of cutter means mounted on the leaf portions of said plate, means for rotating said cutter means, said plate rotating means being responsive to the rotation of, and operatively connected to, said ground engaging wheel, and said plate being adapted upon rotation thereof to move said cutter means into the interstices between plants of the row for cultivating the soil therebetween.

4. Cultivating apparatus comprising a frame adapted to be secured to a tractor for movement therewith, a support mechanism including an upright slidably mounted on said frame, a ground engaging wheel rotatably mounted on said support mechanism, said support mechanism including a rigid beam adapted to extend rearwardly therefrom, a base member pivotally connected to said rigid beam, a substantially cloverleaf shaped plate rotatably mounted on said member, means for rotating said plate, said plate having a pair of apertures in each leaf portion of said plate, a plurality of pairs of clamping disks, each of said pairs having a shaft rotatably mounted thereon, each of said pairs of disks being adapted to be mounted on said plate with said shafts extending through said apertures, a cutter head secured to each of said shafts for rotation therewith, means for rotating said cutter heads, said plate rotating means being actuated by the rotation of said ground engaging wheel, and said plate being adapted upon rotation thereof to move said cutter heads between plants for cultivating the soil therebetween.

5. Cultivating apparatus comprising a frame adapted to be secured to a tractor for movement therewith, a support mechanism including an upright slidably mounted on said frame, a bracket connected to the lower end of said upright, said bracket having a ground engaging wheel rotatably mounted thereon, a rigid beam connected to said bracket, a base member pivotally connected to said rigid beam, resilient means connecting said base member to said upright, a substantially cloverleaf shaped plate rotatably mounted on said base member, means for rotating said plate in response to the rotation of said ground engaging wheel, means for adjusting the rotation of said plate relative to the rotation of said ground engaging wheel, said cloverleaf shaped plate having apertures in each of the leaf portions thereof, a plurality of pairs of clamping disks, each pair of said clamping disks having a shaft adapted to be rotatably mounted thereon, each of said pairs of disks being adapted to be mounted on said plate with said shafts extending through said apertures, a cutter head secured to each of said shafts for rotation therewith, extensible drive shaft means connecting said cutter heads with the power takeoff of said tractor for rotation thereby, a platform connected to said rigid beam for supporting an operator thereon, and said plate being adapted upon rotation thereof to move said cutter heads between plants for cultivating the soil therebetween.

6. Cultivating apparatus for cultivating the soil adjacent a row of spaced plants, said apparatus adapted to be mounted on a tractor type vehicle having a power takeoff, said apparatus comprising a frame, a ground engaging wheel means rotatably connected to said frame, a support mechanism mounted on said frame, cultivating means connected to said support mechanism, said cultivating means comprising a rotatable cutter support means rotatably mounted on said support mechanism, a plurality of horizontally spaced cutter means rotatably mounted on said cutter support means, means adapted to be connected with the power takeoff of the tractor for rotating said cutter means relative to said cutter support means, and driving means for rotating said cutter support means relative to said support mechanism, said driving means operatively connected to said wheel means and responsive to rotation thereof to rotate said cutter support means proportionally to rotation of said wheel means to move said cutter means from a cultivating position adjacent the row of spaced plants into the interstices between the plants for cultivating the soil therebetween.

References Cited by the Examiner

UNITED STATES PATENTS

| | | | |
|---|---|---|---|
| 25,736 | 10/1859 | Hogle | 172—545 |
| 1,031,894 | 7/1912 | Weimer | 172—105 X |
| 2,619,891 | 12/1952 | Sloper | 172—92 |
| 2,732,675 | 1/1956 | Smith et al. | 172—59 X |
| 2,744,459 | 5/1956 | Craig | 172—106 X |
| 2,826,129 | 3/1958 | Olson | 172—59 |
| 2,838,901 | 6/1958 | Davis | 56—25.4 |
| 3,059,704 | 10/1962 | Kasatkin | 172—59 |
| 3,095,045 | 6/1963 | Ennis et al. | 172—38 |

FOREIGN PATENTS 926,291    4/1947    France.

OTHER REFERENCES

Civello Addition 66,875, May 13, 1957, 172–59 (France) Original #1,096,811 (1 sht. dwg., 2 pages spec.).

ABRAHAM G. STONE, *Primary Examiner.*